May 23, 1950　　G. F. HAUF　　2,508,716
PIPE COUPLING
Filed July 17, 1946　　2 Sheets-Sheet 1
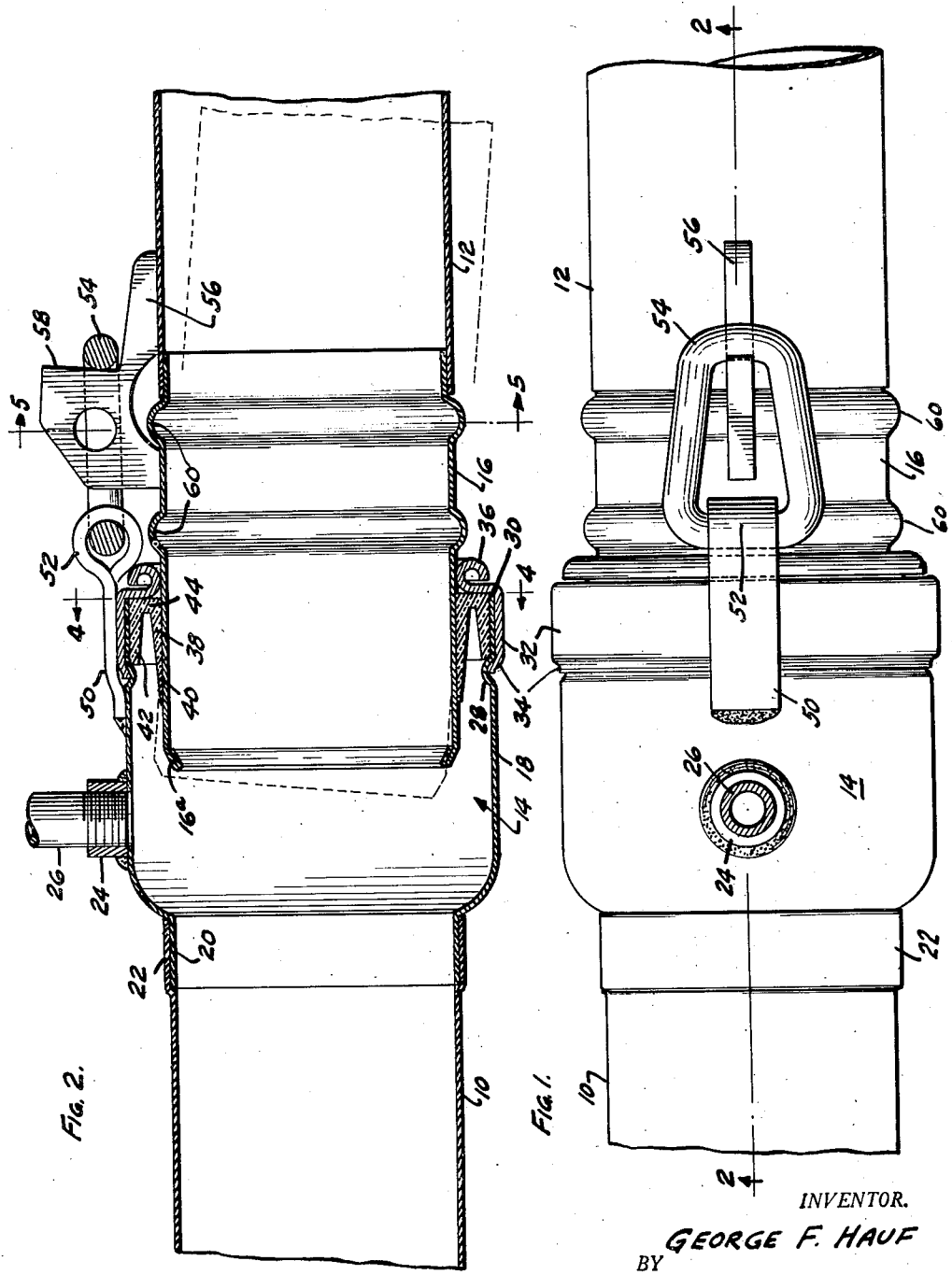
INVENTOR.
GEORGE F. HAUF
BY
Harry H. Hitzeman
ATTORNEY.

May 23, 1950 G. F. HAUF 2,508,716
PIPE COUPLING
Filed July 17, 1946 2 Sheets-Sheet 2

INVENTOR.
GEORGE F. HAUF
BY *Harry H. Hitzeman*
ATTORNEY

Patented May 23, 1950

2,508,716

UNITED STATES PATENT OFFICE 2,508,716

PIPE COUPLING

George F. Hauf, River Forest, Ill., assignor to Chicago Metal Mfg. Co., Chicago, Ill., a corporation of Illinois Application July 17, 1946, Serial No. 684,304

2 Claims. (Cl. 285—163)

My invention relates to improvements in flexible pipe joints or couplings and an improved method of manufacturing the same; and more particularly to flexible pipe joints or couplings particularly adapted to connect together lengths of irrigation piping.

Piping for irrigation purposes is ordinarily constructed of sheet metal such as galvanized iron in suitable lengths having coupler elements on both ends, usually a male coupling member on one end and a female coupling member on the other, so that they may be telescopically joined by some quick detachable means, the coupling members also usually permitting limited angular misalignment of the piping to follow the surface terrain of the land to be irrigated. Since such piping is frequently disassembled and moved to new locations from time to time, it follows that the coupler and quick detachable means must, of necessity, be as simple and easy to operate as possible, yet be rugged and durable so that the same will not easily become broken or out of order. Further, since the flexible joints must be fluid proof and capable of withstanding comparatively high pressures, special attention should be given to the construction of the same.

The principal object of the present invention is to provide in piping of the type described, an improved type of coupling means.

A further object of the invention is to provide an improved process of manufacturing pipe coupling members of the type described.

A further object of the invention is to provide prefabricated male and female connector members capable of connection to lengths of pipe of any description so that when an order for irrigation piping is received the pipe may be cut to the desired lengths, the connector members attached thereto and the complete piping is ready to be shipped.

A further object of the invention is to provide in combination with my improved connector members an improved re-inforced collar and means of constructing the same, so that it is capable of maintaining a sealed connection under unusually high pressures and in any angular alignment of the pipe sections.

A further object of the invention is to provide an improved and simple type of coupling detaching means, so that pipe sections may be easily disconnected even though the coupler members are not easily accessible, such as when buried in mud or lying in the bottom of a ditch as frequently happens in some localities where irrigation pipes are employed.

Other objects and advantages will be more apparent from the following description wherein reference is had to the accompanying two sheets of drawings, upon which Fig. 1 is a plan view of my improved coupler member showing a pair of pipe sections connected thereby;

Fig. 2 is a longitudinal sectional view through the same taken generally on the lines 2—2 of Fig. 1;

Figure 3:
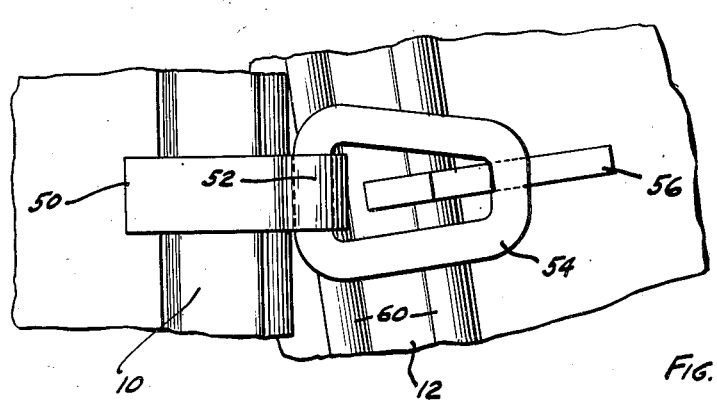
Fig. 3 is a fragmentary plan view showing the quick detachable coupler member in the position it assumes when the two sections of pipe which are connected are disposed at angles.
Figure 4:
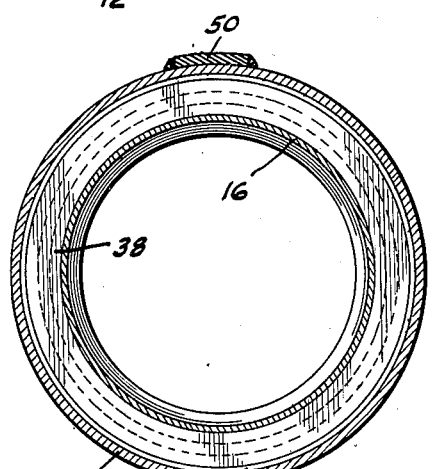
Fig. 4 is a cross sectional view through the female coupler member and associated parts taken generally on the lines 4—4 of Fig. 2.
Figure 5:
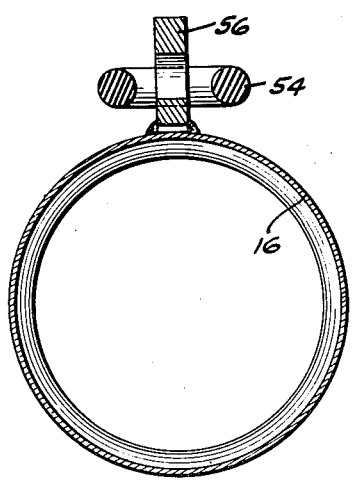
Fig. 5 is a cross sectional view taken on the lines 5—5 of Fig. 2 showing the coupler elements in their locking position.

In the embodiment of the invention which I have chosen to illustrate, in Figs. 1 and 2 I have shown a pair of pipe sections 10 and 12 of any suitable or desirable length having associated therewith the female coupler element 14 and the male coupler element 16 respectively. The pipes 10 and 12, while they may be formed of any desirable material such as cast iron, wrought iron, sheet metal or plastic, are preferably shown as a comparatively thin galvanized sheet metal piping that is formed from flat material shaped about a mandrel and welded together in any desirable manner.

The coupler member 14 may be formed with a cylindrical portion 18 having a portion 20 adapted to be inserted into the forward end of pipe 10 and securely welded to the portion 22 thereof. A shoulder or boss 24 may be mounted upon the top of the coupler member 14 and formed with a tapped bore to receive a vertical header 26. The wall 18 is also preferably formed with an inwardly directed bead or grooved portion 28 at a point spaced from the end 30 of the same.

In order to reinforce the open end 30 of the female coupler member, I provide a sleeve or ring portion 32 which fits snugly over the end 30 of the coupler member 14 and has a portion 34 turned down into the groove 28 to securely lock the sleeve on the end of the coupler. The sleeve may also have a curled portion 36 which forms the reinforced opening through which the forward portion 16—a of the male coupler member 16 may be inserted.

To provide an effective seal to prevent leakage of fluid between the male and female coupler members I provide a generally V-shaped gasket member 38 formed with two annular diverging lip portions 40 and 42 which extend from a thickened apex portion 44. The lip 42 fits against the inner face of the female coupler member 14, being of such size that its extended edge will bear against the annular groove 28. The lip 38 is of a tapered or conical form which is adapted to be stretched when the pipes are connected together to afford a liquid tight joint. Thus fluid under pressure which is passing through the pipe bears against the inner or opposing faces of the lips and as a consequence the liquid pressure in the line assists in keeping the liquid tight seal. Due to the resiliency of the material of which the gasket member is constructed, it can be seen that the pipe 12 may be angularly moved with relation to pipe 10 or vice versa within limits and an effective seal will nevertheless always be kept between the engaging parts.

To pivotally connect the pipes 10 and 12 together and prevent their disengagement in use, I have provided a strap member 50 that is welded or otherwise suitably secured to the upper surface of the female coupler 14. This strap is formed with a circular opening 52 at its extended end and is adapted to receive a generally rectangularly shaped link 54. I provide a block 56 welded or otherwise secured to the upper surface of the male coupler member 16 and 12. This block may be formed with an upwardly extending portion that has a wall 58 at a slight inward taper, so that the link 54 can be snapped over the edge of the same and under ordinary usage cannot be removed. The pipes may be disconnected by using a hook to reach under the edge of the link 54 and pull the same upwardly. The reinforcing grooves 66 of the male coupler member 16 being sufficiently spaced from the entrance to the female coupler 14 so that inward motion may be obtained to raise the link 54.

In order therefore to assemble together sections of irrigation pipe provided with my improved male and female coupler members, it is only necessary to insert the male member through the gasket 38 sufficiently so that the link 54 can pass over the upper edge of the block 56 and rest in the position shown in Fig. 2. When fluid under pressure is placed in the pipe line the same will have a tendency to not only force the sealing member 38 against the walls of the male and female coupler members but it will also serve to draw the connection taut between the link 54 and the block 56. When it is desired to disconnect the pipe sections and even though they may be submerged in mud or ditches and are comparatively inaccessible, it is an easy matter to reach down with a hook member and engage below one side of the link 54 to disconnect the pipe sections. By the use of the reinforcing collar 32 as shown I have found that that possibility of breaking, bending or distorting the female coupler member due to rough handling or frequent usage is largely eliminated.

While I have illustrated and described a specific embodiment of my invention it will be apparent to those skilled in the art that I have provided an effective coupler member for pipe sections and I do not wish to be limited in any particular; rather what I desire to secure and protect by Letters Patent of the United States is:

1. The combination with male and female pipe members constructed of comparatively thin sheet metal of an enlarged cylindrical collar member secured to the end of said female pipe member, said collar member being constructed of thin sheet metal and having an open end, an inwardly turned circular ridge formed therein adjacent to and parallel with said open end, a heavy metal cap telescopically mounted over the open end of said collar member and fastened thereto by having its end turned down into the groove formed by said inturned ridge, said cap having a front wall with a reduced opening therein, a resilient gasket mounted in said collar member and positioned between said circular ridge and the front wall of said cap, said gasket adapted to be stretched when said male pipe member is inserted through the opening in said cap and quick detachable connector means for holding said pipe members against separation during use.

2. The combination with male and female pipe members constructed of comparatively thin sheet metal of an enlarged cylindrical collar member secured to the end of said female pipe member, said collar member being constructed of thin sheet metal and having an open end, an inwardly turned circular ridge formed therein adjacent to and parallel with said open end, a heavy metal cap telescopically mounted over the open end of said collar member and fastened thereto by having its end turned down into the groove formed by said inturned ridge, said cap having a front wall with a reduced opening therein, said opening reinforced by curling over the circular edge of the front wall to a generally cylindrical cross-section, a resilient gasket mounted in said collar member and positioned between said circular ridge and the front wall of said cap, said gasket adapted to be stretched when said male pipe member is inserted through the opening in said cap and quick detachable connector means for holding said pipe members against separation during use.

GEORGE F. HAUF.

REFERENCES CITED

The following references are of record in the file of this patent:

UNITED STATES PATENTS

| Number | Name | Date |
|---|---|---|
| 721,935 | Wells | Mar. 3, 1903 |
| 846,905 | Bruen | Mar. 12, 1907 |
| 2,087,916 | Lanninger | June 27, 1937 |
| 2,278,074 | Hauf | Mar. 31, 1942 |